Sept. 28, 1954 W. G. SOPRANO 2,690,496
TOASTER
Filed Sept. 26, 1952 3 Sheets-Sheet 1
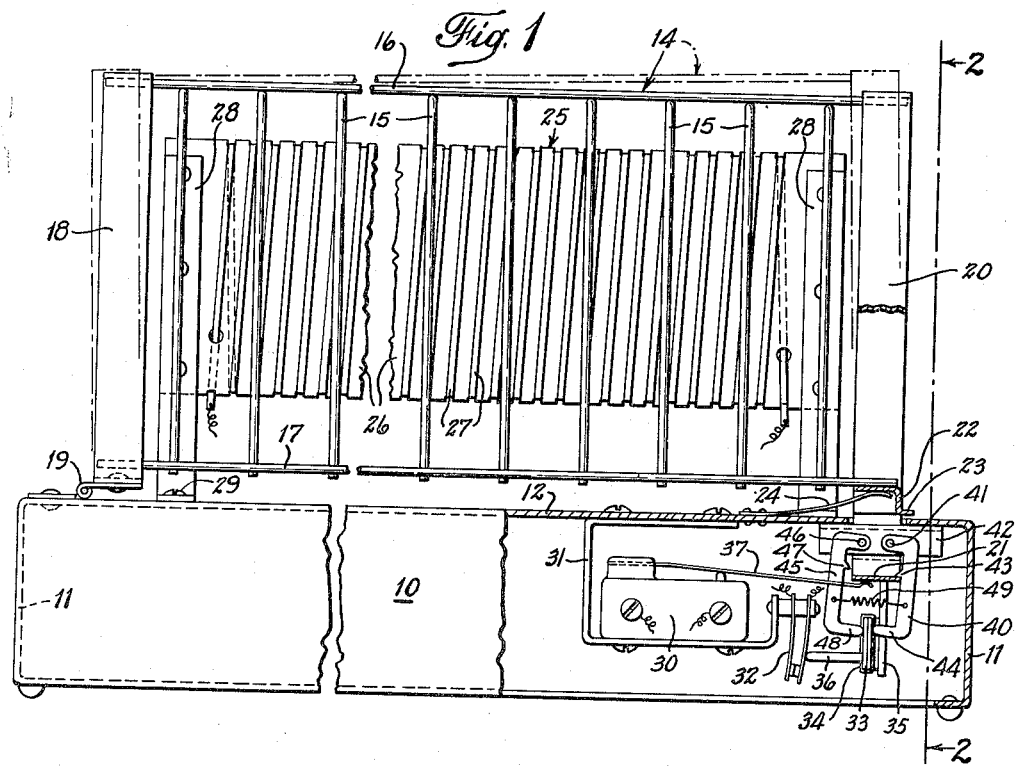
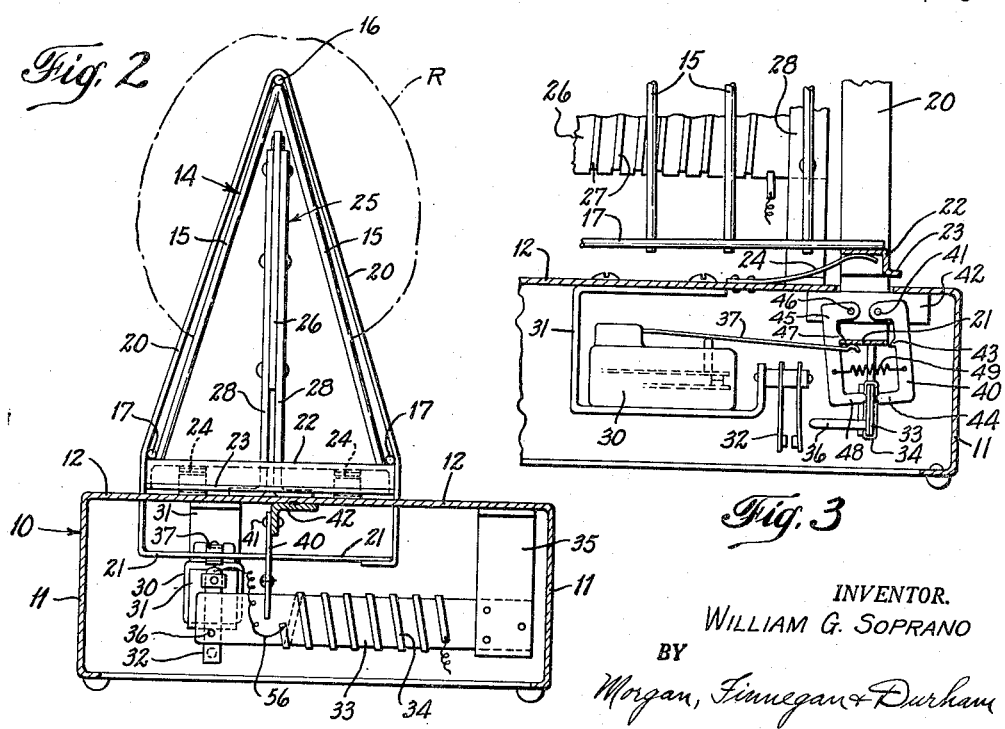
INVENTOR.
WILLIAM G. SOPRANO
BY
Morgan, Finnegan & Durham
ATTORNEYS.

Sept. 28, 1954 W. G. SOPRANO 2,690,496
TOASTER
Filed Sept. 26, 1952 3 Sheets-Sheet 2

INVENTOR.
WILLIAM G. SOPRANO
BY
Morgan, Finnegan + Durham
ATTORNEYS.

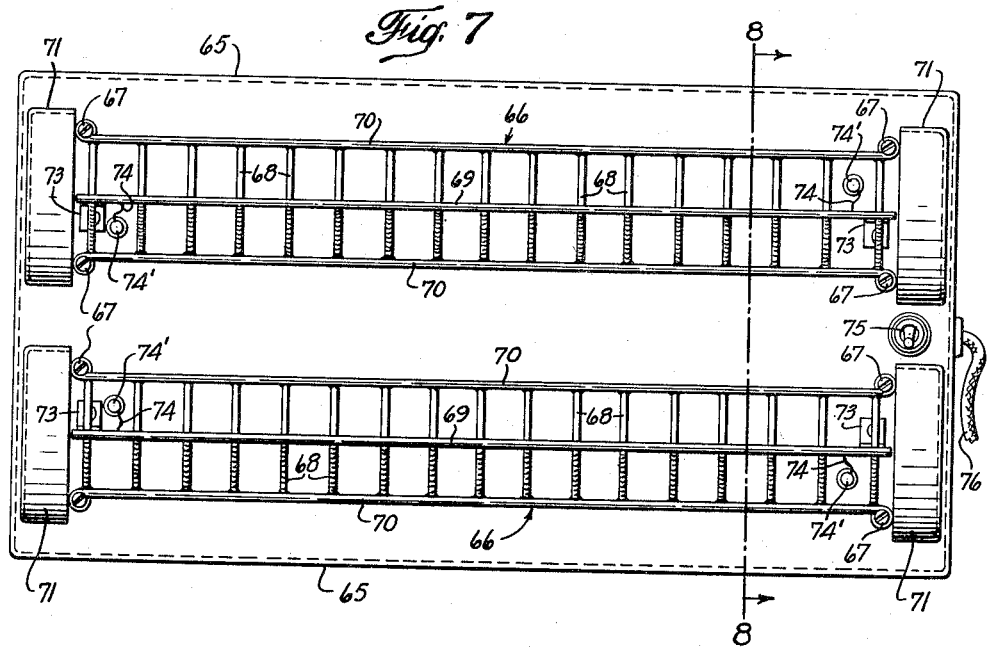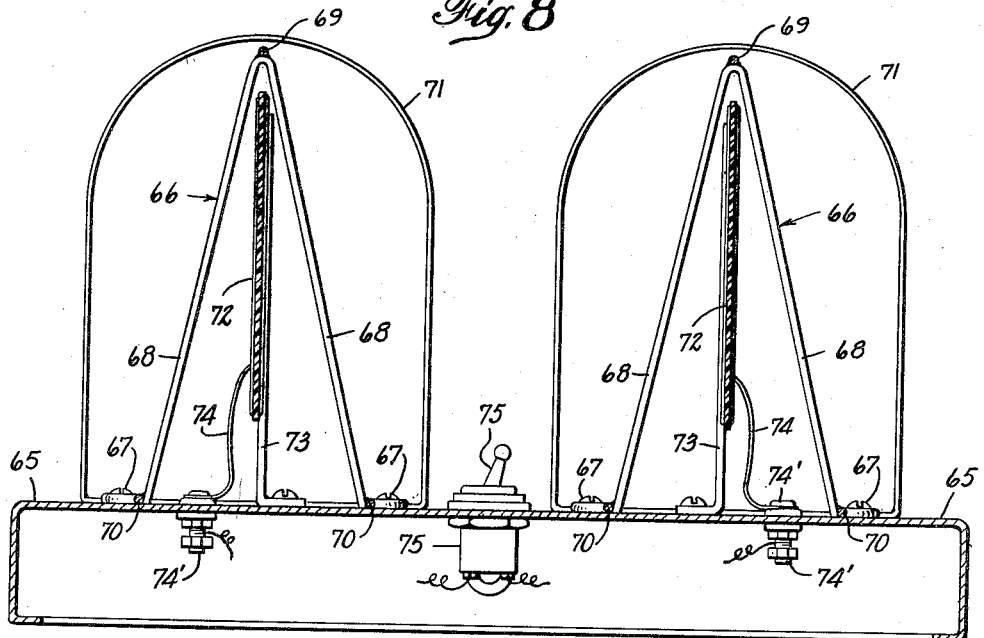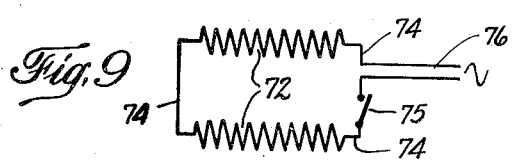

Patented Sept. 28, 1954

2,690,496

UNITED STATES PATENT OFFICE 2,690,496

TOASTER

William G. Soprano, New York, N. Y.

Application September 26, 1952, Serial No. 311,604

4 Claims. (Cl. 219—19)

The present invention relates to food toasting devices and to a device particularly adapted to toasting frankfurter and hamburger rolls, and the like.

Objects and advantages of the invention will be set forth in part hereinafter and in part will be obvious herefrom or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 1 is a side elevation partly broken away of an electric roll toaster embodying the present invention, the parts being shown in the position assumed at the start of a toasting operation;

Fig. 2 is a vertical end section as viewed along the line 2—2 of Figure 1;

Fig. 3 is a fragmentary section similar to the corresponding portion of Fig. 1 but showing the parts in an intermediate position assumed midway of the toasting operation;

Fig. 7 is a plan view of a further embodiment of the invention wherein two roll grills are provided;

Fig. 8 is a vertical section as viewed along the line 8—8 of Fig. 7; and

Fig. 9 is a diagram of the electrical circuit used in the toaster shown in Figs. 7 and 8.

Figure 4:
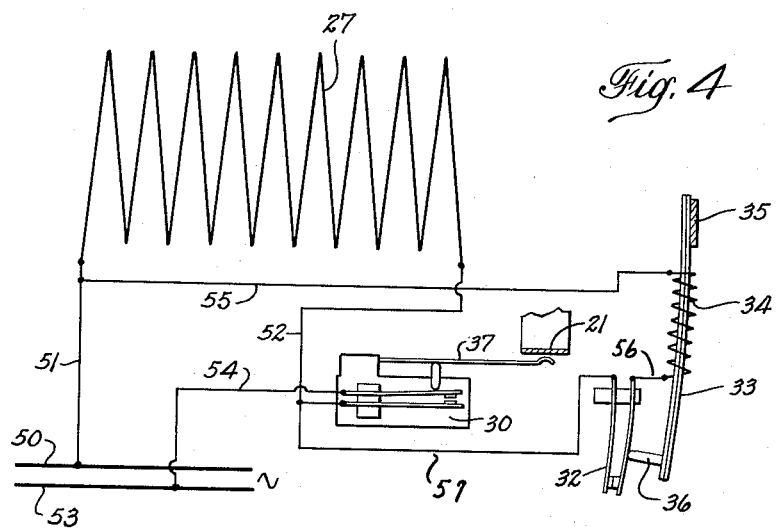
Fig. 4 is a diagram illustrating the electrical circuit applicable to the device shown in Figs. 1, 2 and 3.
Figure 5:
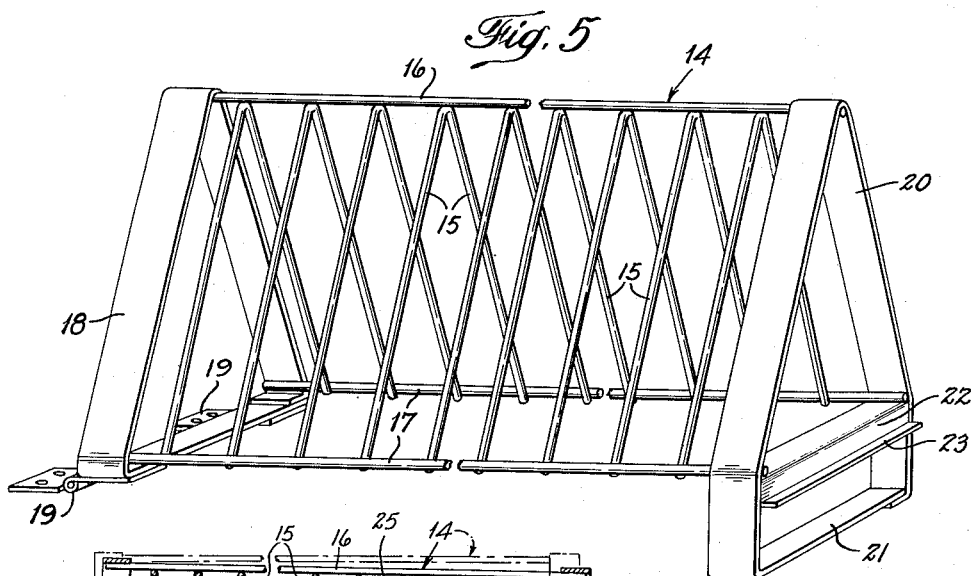
Fig. 5 is a detail view in perspective of the roll supporting grill.

The present invention has for its object the provision of a food toasting device adapted particularly for supporting and toasting the inside faces of partially split rolls, such as the elongated rolls commonly used for serving frankfurters or the more rounded rolls for serving hamburger patties. Other food articles of a similar shape and adapted to partial splitting are equally capable of being toasted on the device. The invention is illustrated herein as fully automatic, semi-automatic or manually turned on and off by switch means, and may be provided with one or more banks of grills for supporting the rolls in toasting position.

In general the toaster comprises a hollow base member in which certain wiring, switches and operating mechanism may be concealed and supported; a roll supporting grill, shaped like an inverted letter V and hinged or otherwise secured to the top of the base member; and a heating element, consisting of a dielectric plate with resistance wire wound thereon, the said heating element being mounted on the base and projecting upwardly between the legs of the grill but spaced therefrom.

In the fully automatic type of toaster, the grill may be hinged, at one end, to the base member, the other end being utilized as part of an electrically-operated latch and switch mechanism which releases the latched-down grill end and shuts off the current to the heating element when the proper time has elapsed for toasting the rolls.

In the semi-automatic form of the invention, the weight of a roll or rolls is utilized to press the hinged grill downwardly so that its free end will operate a switch to turn on the heating element current. When, in the judgment of the operator, the rolls are toasted to the desired degree, the removal of them permits the grill to move upwardly and thus shut off the switch controlling the heating current.

A third, simplified, form of toaster may be provided in which the grill or grills may be fixed at each end on the base member and the current to the heating elements manually controlled by switch means mounted on the base at a convenient spot.

The invention thus provides a means for simultaneously toasting the inside faces of partially split rolls in an economical and efficient manner and without the danger of breaking apart the two halves of the roll.

Referring now to the drawings illustrating an embodiment of the invention and more particularly to the form shown in Figs. 1 to 5, a hollow base member 10 is provided having an open bottom, sides 11 and a top plate 12. Base 10 may be rectangular in shape and considerably longer than its width, with its height merely sufficient to contain certain operating mechanisms. A roll supporting grill 14 is provided which may consist of a plurality of vertically arranged and parallelly-spaced rods 15 which are bent into the from of an inverted V and secured in spaced relation to each other by being attached at their apices, as by welding, to a transverse top rod 16, and at their bottom ends to bottom rods 17. The extending ends of rods 16 and 17, at one end of the grill 14 (left in Fig. 1) are fastened, as by welding, to a triangular end frame 18. The base of end frame 18 is hinged to base 10 by a pair of hinges 19.

The oppositely extending ends of top and bottom rods 16 and 17 (right in Fig. 1) are similarly secured to an end frame 20, generally triangular in shape and having its lower portion and its bottom forming extent 21 projecting downwardly through an aperture in the top plate 12 of base 10. Frame 20 is also provided with a transverse bar 22, secured to the legs of the frame at a point just above where they enter the base aperture. A projecting lip 23 extends from bar 22 and overlaps the margin of the base aperture to serve as a stop to limit the downward movement of the grill 14.

Spring means are provided to urge the grill 14 upwardly about its hinges 19 to its inoperative position (as indicated in dot and dash lines in Fig. 1), and as embodied comprise a pair of leaf springs 24 secured at one end to base top plate 12 and having their free ends pressing upwardly on the underside of frame bar 22. The grill 14, as thus constructed, is particularly adapted to support a partially split and opened roll R, as indicated by dot and dash lines in Fig. 2, in such a manner that the inside faces of the roll may be simultaneously toasted by a heating element 25 arranged to project upwardly between the roll faces as supported on the grill 14. Furthermore, the roll is prevented from completely splitting and thus falling apart by the inverted V shape of the grill whereby a very small spreading of the roll halves is required to render them accessible to toasting heat.

The heating element 25 may consist of a dielectric plate 26, such as mica, appropriately grooved along its top and bottom edges to support and space a conventional resistance strip or wire 27. Plate 26 may be supported in spaced relation to base 10 and grill 14 by legs 28 which may be attached to the base top plate 12 as by screws 29.

Reference is now made to the means for automatically turning on the toasting current, maintaining the heat a desired length of time and then turning if off, the latter operation being accompanied by an audible sound and visual motion to signalize the end of the operation. As embodied, there is provided a micro-switch 30, supported within the hollow base 10 by a bracket 31; a thermostat switch 32, also secured on bracket; and a bi-metal thermostat strip 33 having wound thereon an insulated resistance wire coil 34. The bi-metal strip 33 is arranged parallel to and beneath the grill frame extent 21 and is supported at one end by a bracket 35 depending from the underside of base top plate 12. The free end of the bi-metal strip 33 is provided with a laterally-extending finger 36 projecting towards and arranged to actuate the thermostat switch 32 as the strip 33 flexes laterally under the influence of temperature.

A leaf spring 37, forming the actuating finger for the micro-switch 30, is arranged to project beneath the grill frame extent 21 and so adjusted that the lowermost position of the member 21 closes the micro-switch 30, the intermediate position maintains it closed while the uppermost position permits the switch 30 to open.

Latch means are provided for holding the grill 14 in its down, or operating, position and for unlatching it in two, time determined, stages to permit it to resume its up, inoperative, position. As embodied, a latch lever 40 is provided which is pivoted by a pin 41 to an angle bracket 42 secured to the underside of base plate 12 and bridging the aperture in said top through which the grill frame 20 projects. Lever 40 has a tooth 43 midway along one edge and a finger 44 on its free end. A similar but oppositely facing latch lever 45 is pivoted at 46 on bracket 42 and provided with a tooth 47 and finger 48. Levers 40 and 45 are arranged midway along the edges of frame extent 21 with lever 40 extending normal to the right edge of the frame extent 21 and lever 45 extending normal to the left edge (as viewed in Fig. 1). A tension spring 49, secured to the two levers 40 and 45, urges them towards each other so that their fingers 44 and 48 press against opposite sides of the free end of the bi-metal strip 33. Thus the flexing of strip 33 will swing the levers about their pivots in equal amount but in opposite directions. Tooth 43 on lever 40 is so placed thereon that when the lever is swung to the left, as in Fig. 1, the tooth will catch the edge of frame extent 21 and retain it in its lowest position. Tooth 47 on lever 45 is so placed thereon that when it is swung to the right, as in Fig. 3, the tooth will catch the edge of frame extent 21 and retain it in its mid-position. The upper limit of travel of the frame extent 21 is reached when it strikes the lower edge of the lever supporting bracket 42.

Referring to Fig. 4, the electrical circuit for actuating the toaster is as follows. The resistance strip 27 of the heating element 25 is directly connected at one end to power line 50 by a lead 51, and at the other end is connected to one contact of the micro-switch 30 by a lead 52. The other contact of switch 30 is connected to the return power line 53 by a lead 54. Thus when micro-switch 30 is closed, resistance strip 27 is energized to produce heat. Thermostat coil 34 is connected to power line 50 by leads 55 and 51 and to one contact of thermostat switch 32 by a lead 56. The other contact of switch 32 is connected by a lead 57 to the same contact of micro-switch 30 to which lead 52 is connected, the balance of the return circuit for coil 34 being through lead 54 to power line 53.

*Operation*

The fully automatic toaster is operated as follows. A split roll, or rolls, is placed on the grill 14 and the grill is pressed downwardly to the position shown in Fig. 1. The extent 21 of end frame 20 freely passes tooth 47 of lever 45 and forces its way over tooth 43 of lever 40 which then returns to its position to latch the grill in its lowermost position. Bi-metal strip 33, being cold at this time, is positioned to the left (Fig. 1), and therefore has closed thermostat switch 32. The downward travel of the grill caused the spring finger 37 to close micro-switch 30. Current now flows through the switch 30 to energize the heating element 25. Current also flows through thermostat switch 32, which is closed, to energized thermostat coil 34 on the bi-metal strip 33, thereby slowly heating it. As strip 33 begins to flex to the right under the influence of the heat, the tooth 43 begins to move off the frame extent 21, the tooth 47 moves into the path of travel of the frame extent 21, and the thermostat switch 32 finally opens, thereby cutting the current to thermostat coil 34. Residual heat in the bi-metal strip 33 causes its continued flexing to the right until tooth 43 rides off the frame extent 21, and the latter springs upwardly to be caught by tooth 47 on lever 45 which moved into its path. The grill is thus held in its midposition. Micro-switch 30 is still closed in this position (shown in Fig. 3), and the heating element 25 remains energized to continue the toasting.

The bi-metal strip 33 now begins to cool and flexes to the left, thereby shifting levers 40 and 45 to the left. As it reaches its original, or cold, position the tooth 47 rides off the frame extent 21, the grill springs upwardly and permits micro-switch 30 to open. Finger 36 on bi-metal strip 33 strikes and closes thermostat switch 32. The parts are thus returned to the inoperative position, the toasting has been completed and signalized, and the device is ready for another cycle.

Figure 6:
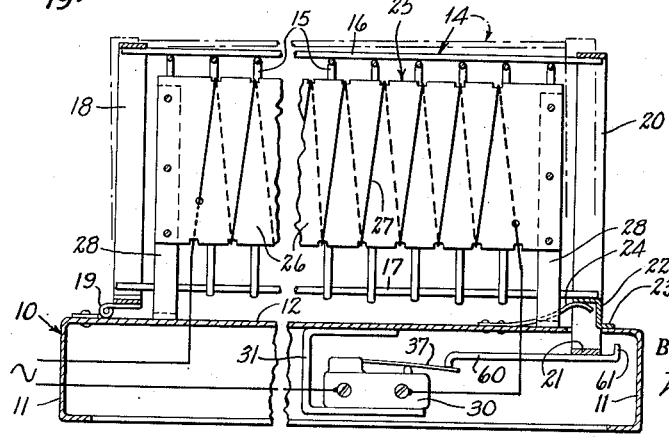
Fig. 6 is a central, vertical, longitudinal section of another embodiment of the invention.

Referring to Fig. 6, a toaster is shown which is similar in appearance and construction to the one just described but is semi-automatic in operation, the latching and thermostat timing mechanisms having been omitted. In this form, the weight of a roll or rolls serves to complete the circuit to a heating element but it is left to the operator to judge the toasting time. When the roll is removed from the grill, the current to the heating element is automatically shut off. In the illustration of this form, Fig. 6, the parts which are similar in shape and function to those shown in Figs. 1 to 5 are given the same reference characters. The micro-switch 30, mounted within the hollow base 10, is a normally open switch and controls the heating element circuit. This switch is operated by an arm 60 which is secured to the frame extent 21 of grill 14 and arranged to close the switch upon downward movement of the grill. The upper, or "off," position of the grill is determined by a finger 61 on arm 60 striking the underside of the base top plate 12.

The form of toaster illustrated in Figs. 7, 8 and 9 is manually operated and has the roll supporting grills fixed to a base, rather than hinged as previously described, and arranged in a double bank. As shown, the toaster consists of a rectangular-shaped hollow base 65 on the top surface of which is fixed a pair of parallelly-arranged roll grills 66, as by screws 67. Each grill 66 may be formed similar to those previously described and comprises a plurality of vertically-arranged and spaced rods 68 bent to the form of an inverted V and secured, as by welding, to a top rod 69 and two bottom rods 70. The ends of each bottom rod 70 are looped to form an apertured foot through which the securing screws 67 project. An ornamental screening member 71 may be mounted on the base 65 adjacent the ends of each grill to protect it and the wiring, and to enhance the appearance of the toaster.

Each grill is provided with a heating element 72, similar to those already described, and is mounted on the base 65 by legs 73 in spaced relation between the legs of the grill members 68. The heating elements 72 may, if desired, be connected in series by appropriate leads 74 and terminal screws 74' to a common switch 75 mounted in any convenient spot on the base. A flexible cable 76 connected to switch 75 passes out of the base 65 and is provided at its end with a conventional male wall plug (not shown). It is to be understood that each heating element 72 may be served by an individual switch if desired. In this form of toaster, it is obvious that its toasting operation is solely under the manual control and timing judgment of the operator.

The invention in its broader aspects is not limited to the specific mechanisms shown and described, but departures may be made therefrom, within the scope of the accompanying claims, without departing from the principles of the invention and without sacrificing its chief advantages.

What I claim is:

1. A toaster comprising, in combination, a base member, a grill member adapted to hold articles to be toasted comprising a pair of longitudinally-extending grill portions upwardly converging and downwardly diverging with respect to each other so as to take the form substantially of an inverted V in cross-section, said grill member adjacent one end thereof being pivotally mounted on said base member, electric heating means positioned between said grill portions, switch means for said electric heating means, a projection on the grill member for closing said switch means upon pivotal movement of the grill, and a control member for the heating means adapted to be moved upon a flow of current in the heating means, said control member being coupled to the projection on the grill so as to move the projection into a switch opening position after a predetermined interval of current flow.

2. A toaster as defined in claim 1, wherein biasing means are provided between said base member and grill member urging the end of said grill member opposite to said pivotally-mounted end upwardly from said base member.

3. A toaster as defined in claim 1, wherein biasing means are provided between said base member and grill member urging the end of said grill member opposite to said pivotally-mounted end upwardly from said base member with a predetermined force adapted to be overcome by a predetermined weight of the article to be toasted when supported on the grill member.

4. A toaster as set forth in claim 1 in which the movable control member comprises a bi-metallic strip of metal wound with electrical wire said control member being coupled to the grill projection by means of a pivoted latch having alternately spaced teeth to hold the projection in one position when the latch is in one limiting position, a second position when the latch moves to the opposite limiting position and a third switch opening position when the latch is returned to its original limiting position.

References Cited in the file of this patent

UNITED STATES PATENTS

| Number | Name | Date |
| --- | --- | --- |
| 1,219,650 | Lightfoot | Mar. 20, 1917 |
| 1,899,681 | Forshee | Feb. 28, 1933 |
| 2,194,848 | Collins | Mar. 26, 1940 |
| 2,206,675 | Ricard | July 2, 1940 |
| 2,414,081 | Barclay | Jan. 14, 1947 |
| 2,558,294 | Finizie | June 26, 1951 |
| 2,559,444 | Locke | July 3, 1951 |